(12) United States Patent
Fochtman et al.

(10) Patent No.: US 10,982,633 B2
(45) Date of Patent: Apr. 20, 2021

(54) FUEL PUMP SOLENOID ASSEMBLY METHOD

(71) Applicant: Continental Automotive Systems, Inc., Auburn Hills, MI (US)

(72) Inventors: James Fochtman, Williamsburg, VA (US); John Walters, Williamsburg, VA (US); Tyler Craven, Norfolk, VA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 185 days.

(21) Appl. No.: 16/024,170

(22) Filed: Jun. 29, 2018

(65) Prior Publication Data

US 2019/0010909 A1  Jan. 10, 2019

Related U.S. Application Data

(60) Provisional application No. 62/528,351, filed on Jul. 3, 2017, provisional application No. 62/528,345, filed
(Continued)

(51) Int. Cl.
*H01F 7/08* (2006.01)
*F02M 37/08* (2006.01)
(Continued)

(52) U.S. Cl.
CPC ............ *F02M 37/08* (2013.01); *F02M 37/10* (2013.01); *F02M 51/04* (2013.01);
(Continued)

(58) Field of Classification Search
CPC ... H01F 7/08; H01F 7/13; H01F 7/081; H01F 7/086; H01F 41/04
(Continued)

(56) References Cited

U.S. PATENT DOCUMENTS 412,677 A  *  10/1889  Sibley .................... B23G 1/185
                                                     408/64
1,394,148 A  *  10/1921  Creveling ................. H02J 7/20
                                                     320/123
(Continued)

FOREIGN PATENT DOCUMENTS

CN        1138302 A     12/1996
CN        1160984 A     10/1997
(Continued)

OTHER PUBLICATIONS

Chinese First Office Action dated Mar. 13, 2020 for the counterpart Chinese Application No. 201810719805.
(Continued)

*Primary Examiner* — Shawki S Ismail
*Assistant Examiner* — Lisa N Homza

(57) ABSTRACT

A solenoid assembly of a fuel pump is disclosed, including a housing having an open end and a partly closed end; a pole piece fixedly disposed within the housing; a bobbin assembly disposed within the housing and including a coil disposed proximal to the pole piece; and a bobbin retainer disposed between the open end of the housing and the bobbin assembly, a radially outer surface of the bobbin retainer contacting the housing. A portion of the housing which is adjacent the bobbin retainer has an outer surface that is recessed and an inner surface that protrudes against the bobbin retainer. The portion is created by deforming the housing to create the protrusion on the inner surface of the housing. The housing inner surface protrusion provides a press fit engagement with the bobbin retainer.

23 Claims, 10 Drawing Sheets

Related U.S. Application Data on Jul. 3, 2017, provisional application No. 62/528,348, filed on Jul. 3, 2017, provisional application No. 62/528,356, filed on Jul. 3, 2017, provisional application No. 62/528,412, filed on Jul. 3, 2017, provisional application No. 62/528,417, filed on Jul. 3, 2017.

(51) Int. Cl.

| | |
|---|---|
| *F16K 31/06* | (2006.01) |
| *F04B 53/10* | (2006.01) |
| *F02M 37/10* | (2006.01) |
| *H01F 7/16* | (2006.01) |
| *F02M 59/46* | (2006.01) |
| *F02M 51/04* | (2006.01) |
| *F02M 63/00* | (2006.01) |
| *F02M 59/10* | (2006.01) |
| *F04B 23/02* | (2006.01) |
| *F02M 55/00* | (2006.01) |
| *F04B 39/10* | (2006.01) |
| *F16K 1/42* | (2006.01) |
| *F16K 15/02* | (2006.01) |
| *F16K 27/02* | (2006.01) |
| *F04B 17/04* | (2006.01) |
| *F16K 15/14* | (2006.01) |
| *F02M 51/06* | (2006.01) |
| *F02M 59/36* | (2006.01) |
| *B21D 39/06* | (2006.01) |
| *F02M 37/54* | (2019.01) |
| *F02D 41/30* | (2006.01) |
| *F02M 37/04* | (2006.01) |

(52) U.S. Cl.
CPC ...... *F02M 51/0614* (2013.01); *F02M 55/007* (2013.01); *F02M 59/10* (2013.01); *F02M 59/367* (2013.01); *F02M 59/462* (2013.01); *F02M 59/464* (2013.01); *F02M 59/466* (2013.01); *F02M 63/0019* (2013.01); *F02M 63/0078* (2013.01); *F04B 17/04* (2013.01); *F04B 23/021* (2013.01); *F04B 39/1046* (2013.01); *F04B 53/10* (2013.01); *F04B 53/103* (2013.01); *F04B 53/109* (2013.01); *F04B 53/1032* (2013.01); *F04B 53/1035* (2013.01); *F04B 53/1087* (2013.01); *F16K 1/42* (2013.01); *F16K 15/02* (2013.01); *F16K 15/028* (2013.01); *F16K 15/14* (2013.01); *F16K 27/0209* (2013.01); *F16K 31/0689* (2013.01); *H01F 7/081* (2013.01); *H01F 7/1607* (2013.01); *B21D 39/06* (2013.01); *F02D 41/3082* (2013.01); *F02M 37/043* (2013.01); *F02M 37/54* (2019.01); *F02M 2200/8053* (2013.01)

(58) Field of Classification Search
USPC ......................................................... 335/281
See application file for complete search history.

(56) References Cited

U.S. PATENT DOCUMENTS

| | | | | |
|---|---|---|---|---|
| 1,625,789 A * | 4/1927 | Braselton | ............... | F02M 37/04 417/211 |
| 1,661,359 A * | 3/1928 | Walters | ............... | B60K 15/077 417/417 |
| 1,779,420 A | 10/1930 | Carter | | |
| 1,932,439 A * | 10/1933 | Bazeley | ............... | B61G 3/04 213/127 |
| 1,949,215 A * | 2/1934 | McCaig | ............... | E04B 2/56 52/464 |
| 2,091,499 A * | 8/1937 | Brown | ............... | F04B 23/021 137/565.17 |
| 2,222,823 A * | 11/1940 | Parenti | ............... | F04B 53/14 417/417 |
| 2,369,282 A * | 2/1945 | Curtis | ............... | F02M 37/103 222/333 |
| 2,984,187 A * | 5/1961 | Prasse | ............... | B62D 5/062 137/565.17 |
| 3,004,884 A * | 10/1961 | Eberl | ............... | D21H 21/56 162/166 |
| 3,181,194 A * | 5/1965 | Daykin | ............... | B60S 1/482 15/250.02 |
| 3,427,263 A * | 2/1969 | Overmars | ............... | C08G 18/246 521/126 |
| 3,507,263 A * | 4/1970 | Long | ............... | F02M 51/02 123/455 |
| 3,515,167 A * | 6/1970 | Svenson | ............... | F04C 14/06 137/565.17 |
| 3,653,630 A | 4/1972 | Ritsema | | |
| 3,735,302 A * | 5/1973 | Eckert | ............... | H01F 7/1607 335/262 |
| 4,203,395 A * | 5/1980 | Cromas | ............... | F02D 31/005 123/339.24 |
| 4,422,420 A * | 12/1983 | Cromas | ............... | F02D 41/40 123/352 |
| 4,860,714 A * | 8/1989 | Bucci | ............... | F02M 37/0023 123/514 |
| 4,928,656 A * | 5/1990 | Ausiello | ............... | F02M 59/30 123/504 |
| 5,070,849 A * | 12/1991 | Rich | ............... | F02M 37/106 123/509 |
| 5,080,077 A * | 1/1992 | Sawert | ............... | F02M 37/02 123/509 |
| 5,103,793 A * | 4/1992 | Riese | ............... | F02M 37/20 123/516 |
| 5,161,083 A * | 11/1992 | Mohler | ............... | G01D 5/2013 324/207.23 |
| 5,289,810 A * | 3/1994 | Bauer | ............... | F02M 37/025 123/510 |
| 5,341,842 A * | 8/1994 | Chih | ............... | F02M 37/025 123/514 |
| 5,361,742 A * | 11/1994 | Briggs | ............... | F02M 37/0029 123/497 |
| 5,389,245 A * | 2/1995 | Jaeger | ............... | F02M 37/20 123/497 |
| 5,415,146 A * | 5/1995 | Tuckey | ............... | B01D 35/0273 123/509 |
| 5,422,836 A * | 6/1995 | Beichter | ............... | G06F 17/16 708/520 |
| 5,452,701 A * | 9/1995 | Tuckey | ............... | B60K 15/077 123/509 |
| 5,458,767 A * | 10/1995 | Stone | ............... | B01D 17/0202 210/90 |
| 5,469,829 A * | 11/1995 | Kleppner | ............... | F02M 37/106 123/510 |
| 5,520,156 A * | 5/1996 | Brunnhofer | ............... | B01D 35/027 123/516 |
| 5,579,739 A * | 12/1996 | Tuckey | ............... | F02D 33/003 123/463 |
| 5,590,631 A * | 1/1997 | Tuckey | ............... | F02D 33/003 123/447 |
| 5,615,780 A * | 4/1997 | Nimetz | ............... | A47B 77/16 211/120 |
| 5,647,330 A * | 7/1997 | Sawert | ............... | F02M 37/10 123/509 |
| 5,649,514 A * | 7/1997 | Okada | ............... | B01D 35/26 123/514 |
| 5,655,504 A * | 8/1997 | Iwai | ............... | F02M 37/0047 123/511 |
| 5,715,798 A * | 2/1998 | Bacon | ............... | F02M 37/025 123/509 |
| 5,718,208 A * | 2/1998 | Brautigan | ............... | F02M 37/048 123/509 |

(56) References Cited

U.S. PATENT DOCUMENTS

| | | | | |
|---|---|---|---|---|
| 5,727,529 | A * | 3/1998 | Tuckey | F02D 33/003 123/497 |
| 5,743,239 | A * | 4/1998 | Iwase | B60K 15/077 123/497 |
| 5,769,061 | A * | 6/1998 | Nagata | F02M 37/44 123/509 |
| 5,791,317 | A * | 8/1998 | Eck | F02M 37/025 123/510 |
| 5,805,331 | A * | 9/1998 | Lee | G02B 26/0858 359/295 |
| 5,960,775 | A * | 10/1999 | Tuckey | F02M 37/106 123/509 |
| 6,076,550 | A * | 6/2000 | Hiraishi | F16K 31/0655 137/550 |
| 6,102,679 | A * | 8/2000 | Brown | F04B 41/02 417/550 |
| 6,106,244 | A * | 8/2000 | Nakatsukasa | B01D 29/15 417/313 |
| 6,113,781 | A * | 9/2000 | Popoff | B01D 35/30 210/234 |
| 6,119,655 | A * | 9/2000 | Heinitz | F02D 41/20 123/447 |
| 6,173,915 | B1 * | 1/2001 | Cohen | F02M 21/0254 239/585.1 |
| 6,776,391 | B1 | 8/2004 | Goossens et al. | |
| 6,837,478 | B1 | 1/2005 | Goossens et al. | |
| 7,021,603 | B2 * | 4/2006 | Wygnaski | F16K 31/0682 251/129.15 |
| 7,209,020 | B2 * | 4/2007 | Telep | H01F 7/13 335/255 |
| 7,240,894 | B2 | 7/2007 | Mills et al. | |
| 7,246,787 | B2 * | 7/2007 | Kumar | F16K 31/0655 251/129.07 |
| 7,347,383 | B2 | 3/2008 | McFarland | |
| 7,377,040 | B2 | 5/2008 | Hornby | |
| 7,753,657 | B2 * | 7/2010 | Strauss | F04B 17/042 417/53 |
| 9,080,684 | B2 | 7/2015 | Stahr | |
| 9,249,894 | B2 | 2/2016 | Stahr | |
| 2002/0113677 | A1 * | 8/2002 | Holmes | F16K 31/0631 335/256 |
| 2002/0190143 | A1 * | 12/2002 | Fochtman | F02M 61/1853 239/585.1 |
| 2005/0145812 | A1 * | 7/2005 | Kumar | F16K 31/0655 251/129.15 |
| 2005/0151104 | A1 | 7/2005 | Goossens et al. | |
| 2011/0253918 | A1 * | 10/2011 | Rampen | F04B 7/0076 251/65 |
| 2011/0285484 | A1 * | 11/2011 | Hoppe | H01F 7/081 335/229 |
| 2015/0357107 | A1 * | 12/2015 | Fochtman | H01F 7/13 417/53 |
| 2016/0108909 | A1 * | 4/2016 | Fochtman | F04B 17/042 417/53 |
| 2017/0120321 | A1 | 5/2017 | Teramoto et al. | |
| 2019/0003474 | A1 * | 1/2019 | Fochtman | F02M 51/0614 |
| 2019/0003611 | A1 | 1/2019 | Fochtman et al. | |

FOREIGN PATENT DOCUMENTS

| | | |
|---|---|---|
| CN | 101201034 | 6/2008 |
| CN | 103850836 A | 6/2014 |
| CN | 105980078 A | 9/2016 |
| DE | 1809954 A1 | 5/1970 |
| DE | 102011005487 A1 | 9/2012 |
| JP | 2004130977 | 4/2004 |
| WO | 9614177 | 5/1996 |

OTHER PUBLICATIONS

File history for U.S. Appl. No. 16/024,348, including non-final Office Action dated Jun. 11, 2020.

Indian Office Action dispatched dated Feb. 11, 2020 for the counterpart Indian Patent Application No. 201814024655.

* cited by examiner

FUEL PUMP SOLENOID ASSEMBLY METHOD

CROSS REFERENCE TO RELATED APPLICATIONS

The present application claims the benefit of the following provisional applications filed on Jul. 3, 2017: application Ser. No. 62/528,348, titled "Combined Inlet and Outlet Check Valve Seat"; application No. 62/528,345, titled "Asymmetric Spring Valve Disk"; application No. 62/528, 356, titled "Hydraulic Damping of a Solenoid"; application No. 62/528,412, titled "Fuel Pump Valve Configuration and Assembly"; application No. 62/528,351, titled "Fuel Pump Solenoid Assembly Method"; and application No. 62/528, 417, titled "Fuel Sending Unit Assembly and Operation." The content of these provisional patent applications are incorporated by reference herein in their entirety.

FIELD OF INVENTION

The present invention relates to a solenoid for a fuel pump, and particularly to a fuel pump solenoid assembly and a method for constructing and utilizing the solenoid assembly.

BACKGROUND

Gasoline fuel pumps have been used for years and can be driven mechanically or electrically driven. Among the electrically powered fuel pumps, the most common style is submerged in a fuel tank and has a turbine to push fuel from the pump into the fuel line. This style pump is designed for a system that requires a constant flow of pressurized fuel from the tank and into the fuel line. It pumps fuel and draws electrical power for the entire time the ignition is "on" or the engine is running. Fuel typically passes through a filter between the tank and the fuel rail. Fuel injectors, which provide the fuel to the internal combustion engine, are ported into the fuel rail. These fuel injectors require relatively precise control of the fuel pressure to provide accurate metering of fuel required by the engine. To accomplish this, the fuel rail also has a pressure regulator which controls the pressure in the rail (and effectively the injectors) by allowing any overpressure fuel to pass through the regulator and return to the tank by means of an additional fuel line.

The problems with the prior fuel pump, is really a problem with the pump and the system components needed to allow the system to operate. Such prior pumps/systems are also heavily focused on automotive applications, which have high fuel flow and complex system controls which the automobile can bear the cost and the weight/size since that was the intended application for these system components. The problem for these pumps/systems appears while incorporating this system into small displacement, non-automotive systems. For example, a 125 cc scooter designed originally to operate with a naturally aspirated engine (carbureted), does not have the space in the fuel tank or the ability to bear the cost of an oversized system developed for automobiles. This example application would also have problems delivering the electrical power required to operate the fuel pump and all of the system components, especially running the pump continuously while at idle, since the system was originally designed to provide minimal electrical power used for accessories.

Solenoids have been fabricated to power electromechanical devices, including fuel pumps, for many years. At a minimum, solenoids all include a magnetic pole, a coil and an armature, but most used in high speed electromagnets have components designed to have a return path for the magnetic flux. A common configuration for solenoids is to have the armature separated from the pole and held in that position with a preloaded spring when the solenoid is de-energized, having no current circulating inside the coil. When a differential voltage is applied to the coil, electrical current builds which then generates magnetic flux. This flux creates an attraction force on the armature and when this magnetic force is equal to the spring force biasing the armature in the position away from the pole, the armature begins to move towards the pole and stores additional potential energy in the bias spring. As long as the magnetic force exceeds the other forces acting on the armature, the armature will continue moving towards the pole until it reaches a predesigned stop which counteracts the magnetic force and stops the motion.

Prior solenoid designs were plagued with problems. Earlier designs were expensive, difficult to assemble, did not operate at high frequency, failed durability, were noisy and suffered from unstable performance. The use of rubber disk "shock absorber" disposed between the displaceable armature and the stationary pole, to lessen the impact noise from the armature assembly of the energized solenoid at the end of a stroke, made proper assembly difficult and was often partially installed which impacted the solenoid's performance due to axial stroke variation. The rubber disk adversely effected operation during high frequency due to the elastomer resilience. The rubber took greater than 50 milliseconds to return from the deformed state due to impact to the at rest shape. The rubber also created stiction between the armature and the rubber disk exaggerating the negative impact on the solenoid's performance. The rubber shock absorber disk did not only impact the solenoid's performance across a single cycle, during endurance testing the dynamic performance of the rubber disk changed which changed the performance of the solenoid over time, creating failures during life testing. Lastly, the position of the pole piece of the solenoid to the armature assembly was critical to setting the stroke as well as the free operation of the armature.

SUMMARY

Example embodiments are directed to solenoid assembly for a fuel pump. In an example embodiment, the solenoid assembly includes a housing having an open end and a partly closed end; a pole piece fixedly disposed within the housing; a bobbin assembly disposed within the housing and including a coil disposed proximal to the pole piece; and a bobbin retainer disposed between the open end of the housing and the bobbin assembly, a radially outer surface of the bobbin retainer contacting the housing. A portion of the housing which is adjacent the bobbin retainer has an outer surface that is recessed and an inner surface that protrudes against the bobbin retainer.

The housing, including the portion thereof, may be integrally formed as a unitary member.

The bobbin assembly may include a bobbin around which the coil is wound, the bobbin includes a ledge, and the pole piece includes a ledge on which the ledge of the bobbin rests.

The bobbin retainer has a press fit engagement with the portion of the housing and a slip fit relationship with the housing not containing the protruding inner surface, the press fit engagement fixing the bobbin retainer within the housing.

In an example embodiment, the solenoid assembly includes a plurality of flux washers which are disposed externally of the housing along the partly closed end thereof, the flux washers forming a stack of flux washers. The partly closed end of the housing includes a central aperture defined through the partly closed end, an end of the pole piece extends from the central aperture of the partly closed end of the housing, and the flux washers are disposed around the end of the pole piece. The pole piece extends over a portion of the stack of flux washers so as to clamp the stack in place against the housing. The end of the pole piece is crimped over the portion of the stack of flux washers.

According to another example embodiment, a method of assembling a solenoid assembly includes obtaining a pole piece; obtaining a bobbin assembly and attaching the bobbin assembly to the pole piece, the bobbin assembly including a bobbin and a coil wound around the bobbin; obtaining a housing and covering the pole piece and the bobbin assembly with the housing; deforming a portion of the housing; and obtaining a bobbin retainer and inserting the bobbin retainer in the housing so that an inner surface of the portion of the housing contacts an outer surface of the bobbin retainer.

In an aspect, deforming the portion of the housing may include obtaining a slide member, placing the slide member around the housing and moving the slide member towards the housing so as to contact and deform the portion thereof. The method may further include obtaining a cover member having a tapered inner surface and placing the cover member over the housing and the slide member, and moving the slide member may include moving the cover member relative to the housing and the slide member so that contact between the inner surface of the cover and the slide member moves the slide member towards the housing.

The method may further include obtaining a positioning member and placing the housing on the positioning member, obtaining a base member, positioning the base member relative to the positioning member, and connecting the cover member to the base member so that a position of the cover member relative to the base member is adjustable.

Moving the cover member may include adjusting the position of the cover member relative to the base member.

The housing may include an open end and a partly closed end, and the method may further include obtaining a plurality of flux washers and placing the flux washers over the partly closed end of the housing in a stacked arrangement. Covering the pole piece may include inserting an end of the pole piece through the partly closed end of the housing, placing the flux washers comprises placing the flux washers around the end of the pole piece, and the method may further include crimping the end of the pole piece so that the end of the pole piece extends over at least part of the stacked arrangement of the flux washers and secures the flux washers to the housing.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

The following description of the example embodiments is merely exemplary in nature and is in no way intended to limit the invention, its application, or uses.

Example embodiments are directed to the solenoid assembly of a fluid pump, such as a submerged fuel pump for an apparatus such as a vehicle. The solenoid assembly is configured to be operatively connected to a valve assembly or group in forming the fluid pump. The solenoid assembly of the example embodiments is described below as being configured for operative connection with a valve assembly for a fuel pump, but it is understood that the solenoid assembly may be operatively connected to a valve assembly for a fluid pump to pump fluid in applications other than as a fuel pump.

Figure 1:
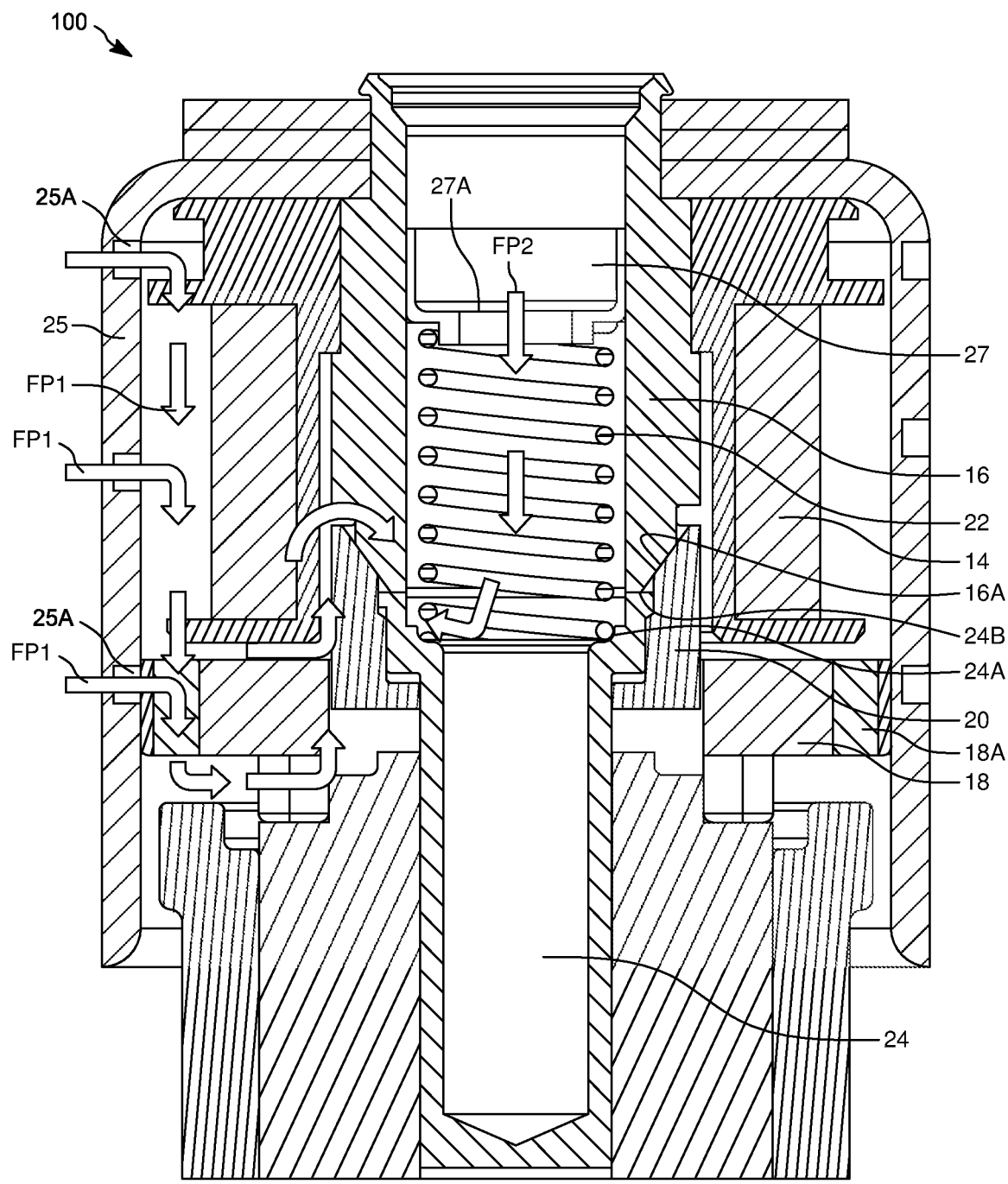
FIG. 1 is a cross sectional view of a solenoid assembly according to an example embodiment.

In a first embodiment illustrated in FIG. 1, a solenoid assembly 100 forming a power group of a fuel pump (not shown) includes a pole piece 16 positioned at the center of the solenoid assembly 100. This magnetic pole piece 16 is generally cylindrical in shape with a hollowed out inner diameter (ID). One axial end portion of the ID is directly exposed to the atmosphere and/or fluid outside of the fuel pump and the other axial end portion is exposed to the inside of the pump, where an armature assembly exists. The armature assembly includes an armature 20 and a plunger 24 connected thereto. The armature assembly is displaceable within the solenoid assembly 100. One axial end portion 16A of the pole piece 16 has a 360 degree frusto-conical shape. This end portion 16A is part of the pole piece 16 that interacts with the slanted surface of the armature 20. The radial inner surface, and/or inner diameter, of the pole piece 16 is sized for receiving a spring 22 therein. Pressed inside the pole piece 16 inner diameter is a spring retainer 27 that retains the spring 22. The spring retainer 27 is a cup-shaped plug having a cylindrical sidewall for contacting the inner surface of the pole piece 16. The spring retainer 27 further includes a ledge which is positioned orthogonally to the cylindrical sidewall and sized for retaining the upper end of the spring 22. The spring retainer 27 is fixedly secured within the pole piece 16 at a position so that the spring 22 provides the desired bias and/or load to the plunger 24 in a downward direction, relative to the view depicted in FIG. 1. A central through-hole or aperture 27A is defined axially through the base or bottom part of the cup-shaped spring retainer 27. When the solenoid assembly forms part of the fuel pump that is inserted into the fuel tank of a vehicle or other engine powered device, the central through-hole 27A allows for fuel to pass between the fuel tank and the space between the armature 20 and the pole piece 16, as described in greater detail below.

The solenoid assembly 100 further includes a housing 25 which surrounds and contains the components of the solenoid assembly discussed above. The housing 25 is largely shaped as an inverted cup and includes one or more apertures 25A defined therethrough.

Surrounding the pole piece 16 in the housing 25 is a bobbin assembly including a coil 14 and a bobbin 17. The armature assembly is displaceable within the solenoid assembly 100 responsive to a current passing through the coil 14 and/or the bias force provided by the spring 22. Positioned below the pole piece 16 is the armature assembly. A bobbin retainer 18 is disposed below the armature assembly. The bobbin retainer 18 extends radially outwardly to the inner surface of the housing 25 and has a radially inward surface which is disposed proximal to the radially outer surface of the armature 20. The bobbin retainer 18 may further include one or more through-holes or apertures 18A which extend axially therethrough. The apertures 18A allow for fuel to pass therethrough for cooling the solenoid assembly, including the coil 14, and for hydraulically damping the armature assembly, as discussed in greater detail below. The armature assembly includes a controlled actuation stroke. The bobbin retainer 18 is configured to be disposed on a bushing 26 of the valve assembly to which the solenoid assembly is operatively coupled in forming the fuel pump. The plunger 24 is movably disposed at least partly in the bushing 26 of the valve assembly.

The armature 20 has a hollowed out ID that allows for the cylindrical nonmagnetic material plunger 24 to be press fit inside of the armature 20. Two interfaces exist on the top of the plunger 24 of the solenoid assembly 100 of FIG. 1. One interface is a spring seat 24A which is where the spring 22 applies a load in order to control the calibration of the fuel pump. The other is an impact area 24B which is the surface of the plunger 24 that impacts the pole piece 16 during solenoid energization once the armature 20 has traveled its full stroke. The actuation stroke/distance is the distance from the tip of the pole piece 16 (at the cone) to the impact surface 24B of the plunger 24.

When the solenoid assembly 100 is energized/powered and actuated, the armature 20 is pulled towards the pole piece 16. Eventually the plunger 24 makes contact with the pole piece 16. The point of contact between the pole piece 16 and plunger 24 is very close and axially in line with the hollowed ID of the pole piece 16. When the solenoid assembly 100 is deactivated, the spring 22 pushes the plunger 24 which in turn pushes the armature 20 back, away from coil 14 and towards the resting position of the armature 20. This actuation cycle of the solenoid assembly 100 in a fuel pump can help at low frequency (5-10 Hz) to high frequency (120 Hz).

Figure 2:
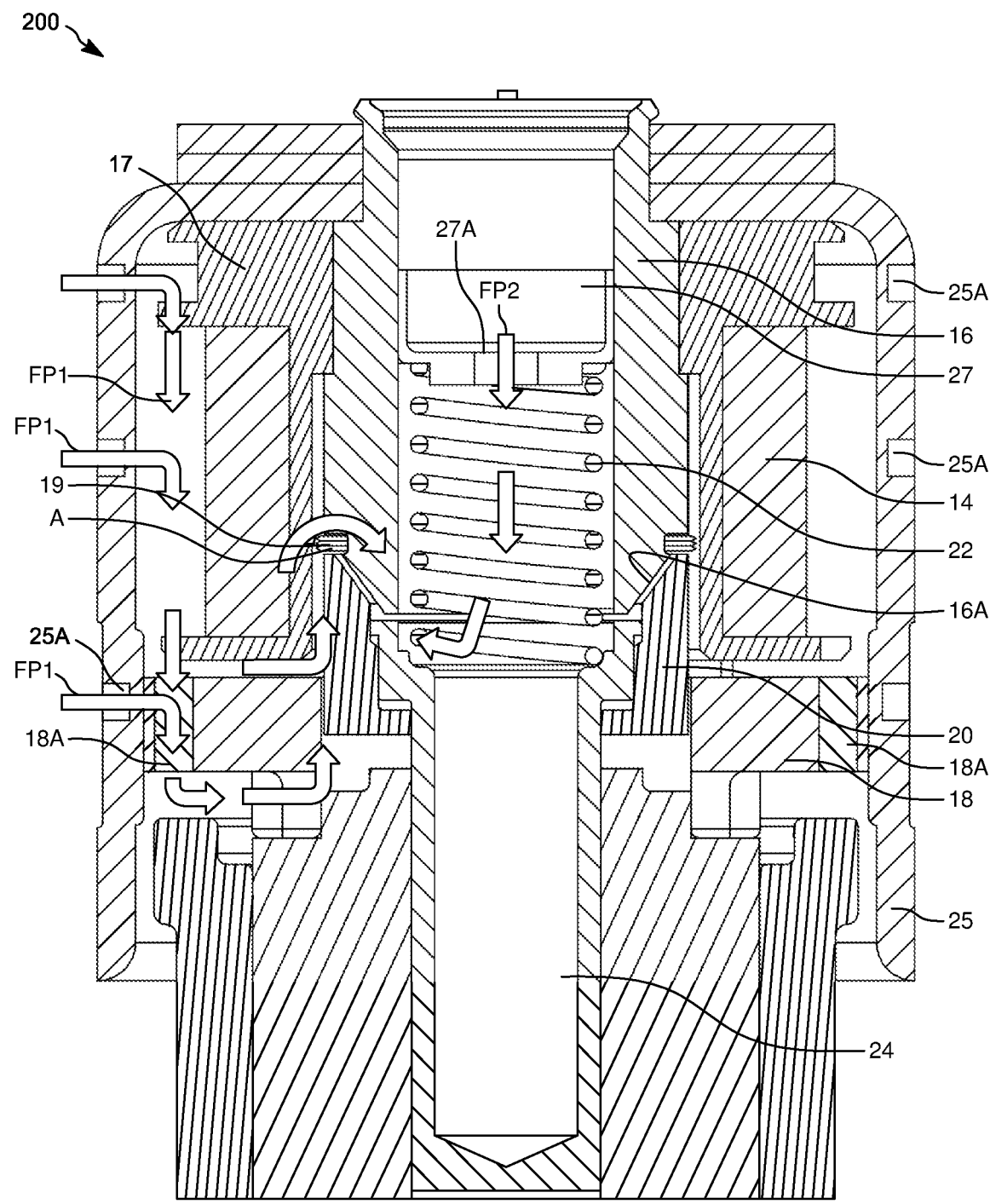
FIG. 2 is a cross sectional view of a solenoid assembly according to another example embodiment.

FIG. 2 illustrates a solenoid assembly 200 assembly according to a second example embodiment. The solenoid assembly 200 assembly of FIG. 2 includes similar components found in the solenoid assembly 200 assembly of FIG. 1, such as the coil 14, the pole piece 16, the armature assembly having the armature 20 and the plunger 24, the spring 22, and the spring retainer 27, configured as described in FIG. 1. In contrast to the solenoid assembly 100, the solenoid assembly 200 and/or the pole piece 16 thereof includes a plurality of shock absorbing, annular disks 19 which are disposed around an outer diameter of a portion of the pole piece 16 proximal to, and at the base of, the frusto-conical end portion, and abut against a downwardly facing surface of the pole piece. Further, in the solenoid assembly 200 of FIG. 2, instead of the plunger 24 contacting the bottom surface of the pole piece 16 at the end of a stroke, in this example embodiment the armature 20, moving in an upward direction due to current passing through coil 14, contacts the annular disks 19 which advantageously serve to decelerate the armature 20 and the plunger 24 prior to coming to a complete stop. In example embodiments, disks 19 serve as metal shock absorbing elements. The pole piece 16 may have a single or a plurality of the annular disks 19 attached thereto, which act to create a fluid "cushion" layer between the pole piece 16 and disks 19 which decelerates the armature 20 during impact with the pole piece 16 so as to reduce the impact noise. The metal disks 19 reduce noise without the problems of stroke control, wear during durability and difficult assembly associated with the prior designs. These disks 19 are also used to control the minimum air gap between the pole piece 16 and the armature 20, which is important in controlling magnetic field levels which have to decay when the solenoid assembly 200 is de-energized at or near the end of a stroke.

The number of disks 19 may be any number, and in the example embodiment illustrated is three. The disks 19 are thin, on the order of 0.15-0.25 mm, stainless steel and resemble a typical washer. These disks 19 are secured in a snap-fit engagement with a locking feature machined on the pole piece 16. The disks 19 act as an impact damper, reduce wear over life cycling, and maintain a precise minimum air gap between the pole piece 16 and the armature 20 which is of importance to the magnetic performance of the solenoid assembly 200 and/or the fuel pump.

Figure 3:
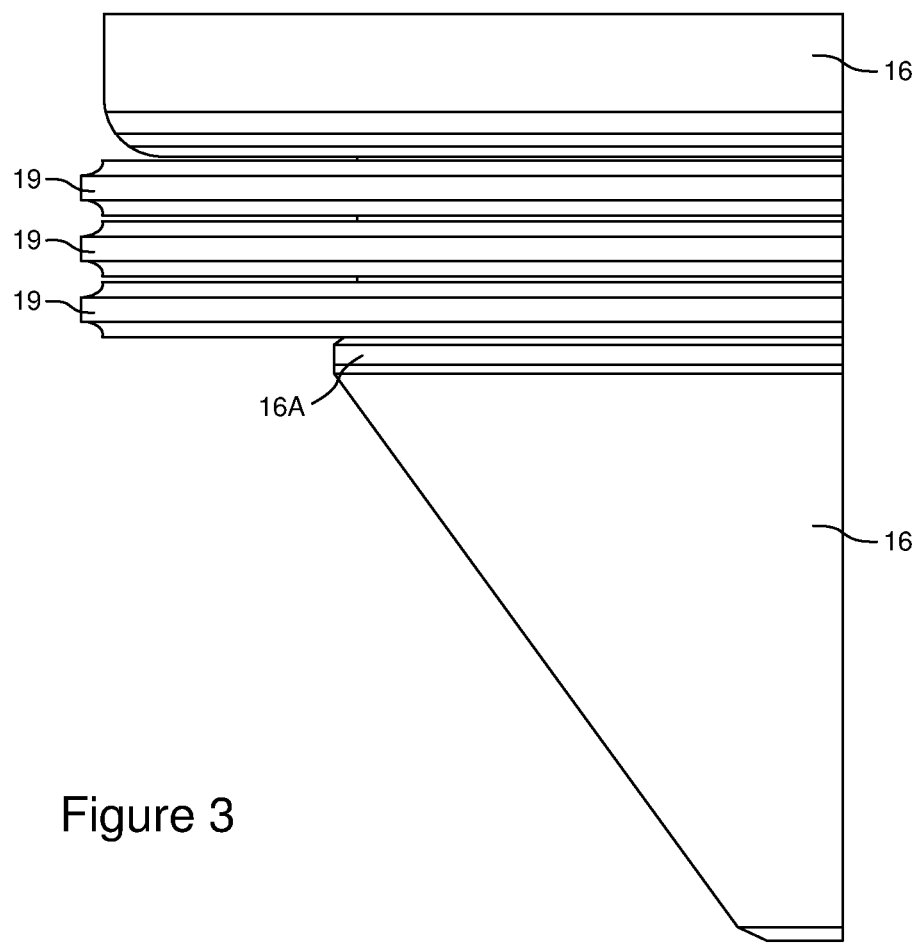
FIG. 3 is an expanded side view of a shock absorbing portion of the solenoid assembly of FIG. 2.
Figure 4:
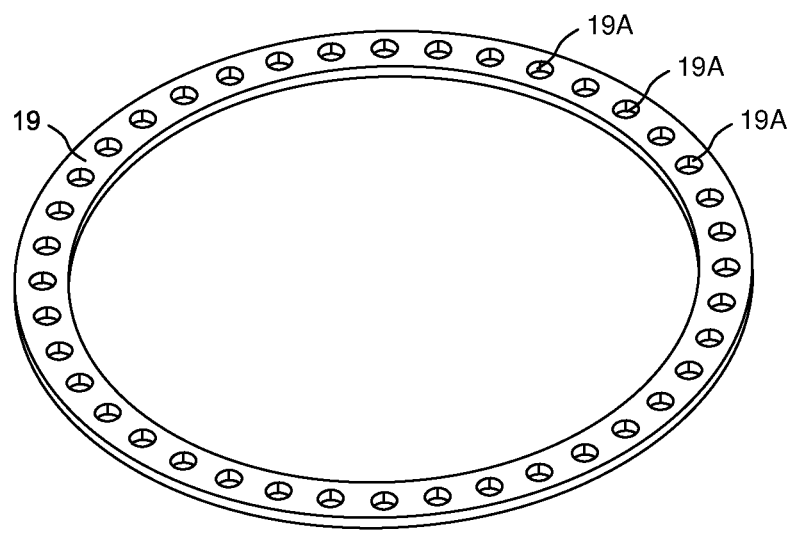
FIG. 4 is a perspective view of a shock absorbing disk of the solenoid assembly of FIG. 2 according to an example embodiment.
Figure 5:
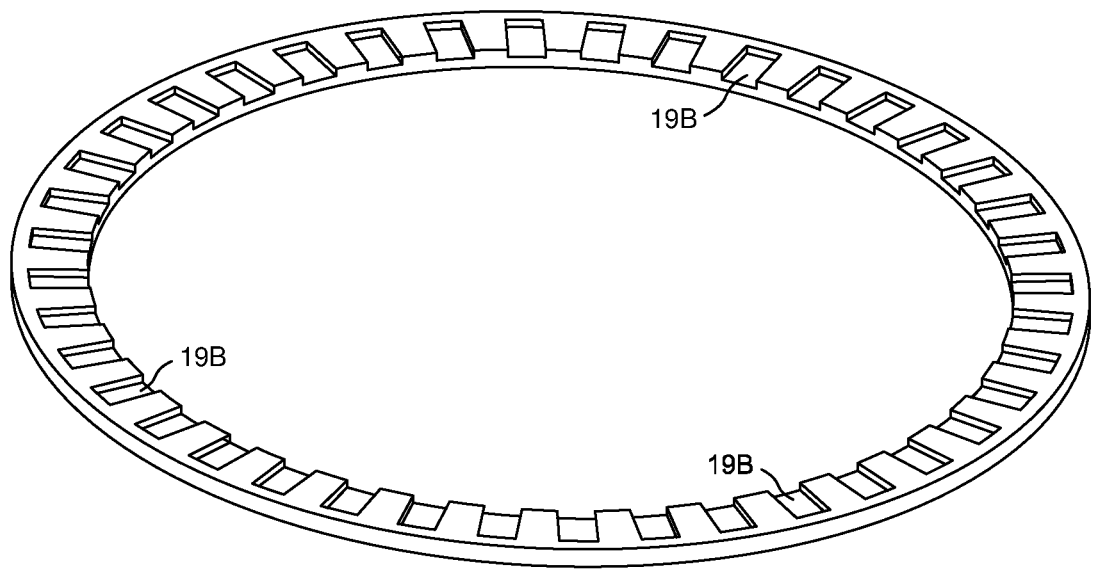
FIG. 5 is a perspective view of a shock absorbing disk of the solenoid assembly of FIG. 2 according to another example embodiment.
Figure 6:
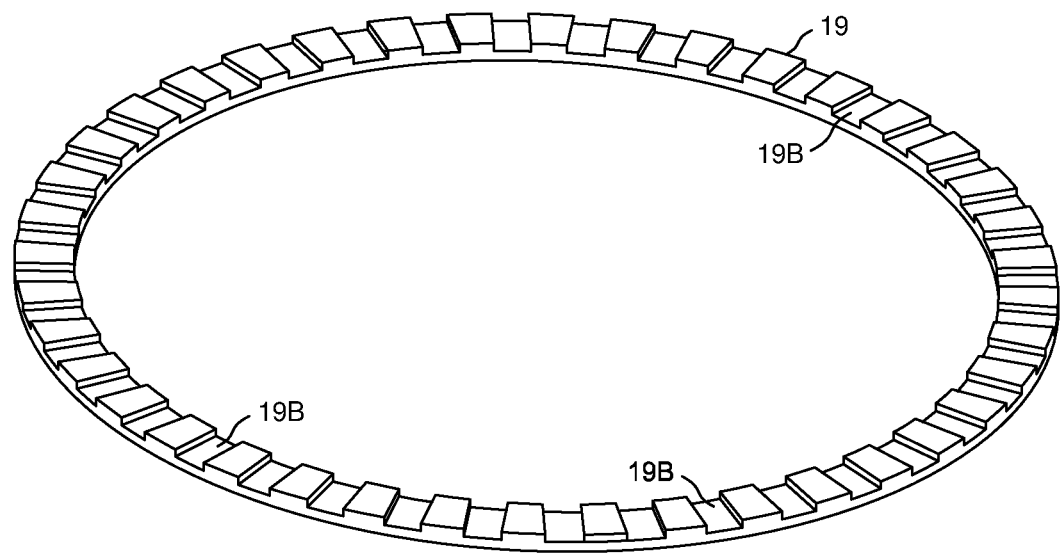
FIG. 6 is a perspective view a shock absorbing disk of the solenoid assembly of FIG. 2 according to another example embodiment.

FIG. 3 illustrates an expanded side view of a portion of the pole piece 16 and disks 19. As illustrated, disks 19 are in a stacked arrangement. In an example embodiment, disks 19 are flat, ring shaped having an inner diameter and outer diameter. In another example embodiment illustrated in FIG. 4, one or more disks 19 may include a plurality of apertures 19A defined axially through the disk. In yet another embodiment illustrated in FIG. 5, disks 19 may include a plurality of cutout portions or dimples 19B which are defined along one or both of the major surfaces of disk 19. The cutout portions 19B are disposed circumferentially along the ID of disk 19. In the illustrated embodiment, each cutout portion 19B has the shape of a rectangular prism which extends from the inner diameter edge towards the outer diameter edge, but it is understood that each cutout portion 19B may have a different cutout shape. In FIG. 6, cutout portions 19B extends along a major surface of disk 19 from the inner diameter edge to the outer diameter edge. The cutout portions 19B and apertures 19A provide pockets of fuel which, during impact by the armature 20, are compressed. Still further, each disk 19 may be shaped as a Belleville washer, having a slight convex surface so as to have a spring effect in a disk stack.

In the example embodiments, hydraulic damping is introduced into the solenoid assembly 100, 200 of the fuel pump to further reduce the noise generated from the armature assembly impacting the pole piece 16 and/or the shock absorbing disks 19. Each solenoid assembly 100, 200 includes plural fluid paths through which a secondary or "parasitic" swept volume of fuel is passed during operation of the solenoid assembly. This secondary swept volume is considered secondary relative to the primary swept volume of fuel of the pump valve to which the solenoid assembly 100, 200 is operatively coupled. In this regard, solenoid assembly 100, 200 may include the secondary pumping chamber and/or associated secondary fuel paths disclosed in U.S. patent publication 20160108909, the content of which is incorporated by reference herein in its entirety.

Specifically, a first fluid path FP1 is defined generally between the apertures 25A of housing 25 and the region surrounding the area of impact with the pole piece 16. For the solenoid assembly 100 and 200, the first fluid path FP1 includes spaces between the coil 14 and the inner surface of the housing 25, between the top surface of the bobbin retainer 18 and the bobbin 17, the space in the aperture 18A of the bobbin retainer 18, the space between the outer radial surface of the armature 20 and the inner radial surface of the bobbin retainer 18 and the bobbin/coil, the space beneath the bobbin retainer 18. A second fluid path FP2 is defined between the through-hole 27A of the spring retainer 27 within the hollowed out region of the pole piece 16. The first and second fluid paths are indicated in FIGS. 1 and 2 as arrows, and it is understood that the flow of fuel through the first and second fluid paths may be in the direction of the arrows or in the direction opposite thereto. In general terms, the secondary swept volume of fuel associated with the armature assembly is collected and dispersed from the solenoid assembly during reciprocation of the armature assembly when the fuel pump is operating. The secondary swept volume is discharged when the solenoid assembly is energized and collected when the solenoid assembly is de-energized. During solenoid energizing, the previously collected secondary swept volume is discharged through the second fluid path FP1 as well as the first fluid path FP1 via the region surrounding the area of impact of the armature assembly with the pole piece 16 (the impact between the top of the plunger 24 and the pole piece 16 for the solenoid assembly 100, and between the armature 20 and the disks 19 for the solenoid assembly 200). By suitably configuring the first fluid path FP1 and the second fluid path FP2, the amount of fuel and the fuel flow rate through the region surrounding the area of impact of the armature assembly with the pole piece 16 can be controlled so as to provide damping when the armature assembly moves close to the pole piece 16 near the completion of a full stroke. This is achieved by passing some of the secondary swept volume through the second fluid path FP2 for discharge without passing through the region surrounding the area of impact between the armature assembly and the pole piece (which, for the solenoid assembly 200, includes the disks 19) so that a sufficient amount of the fuel passes through such region (and subsequently through the first fluid path FP2) to provide the desired amount of damping of the armature assembly.

The operation of the solenoid assembly 100 of FIG. 1 will be described. With the solenoid assembly de-energized, in the absence of a magnetic force acting on the armature 20, the spring 22 urges the armature 20 away from the pole piece as the armature assembly toward its de-energized position. With the solenoid assembly 100 being part of a submerged fuel pump, a pressure differential exists in the space above the armature assembly and the pressure of the fuel tank such that fuel is drawn in the first fluid path FP1 and the second fluid path FP2 from the fuel tank external to the solenoid assembly, in the direction of the arrows depicted in FIG. 1, and collects in the fluid paths FP1 and FP2 and in the space between the angled or slanted surfaces of the armature 20 and the pole piece 16.

When the solenoid assembly 100 is energized, the armature 20 moves in response to the now built magnetic field, toward the pole piece 16. As the armature assembly moves closer to the pole piece, the space narrows between the armature 20 and the pole piece 16 and forces the fuel in the space as well as the space above the plunger 24 to flow therefrom. With the first fluid path FP1 being relatively narrow, the size (and leading edge, relative to the flow of fuel) of the through-hole 27A of the spring retainer 27 is configured so that the amount of fuel exiting the solenoid assembly 100 through the through-hole 27A allows for a controlled flow of fuel through the angled surfaces of the armature 20 and the pole piece 16 and particularly between the impact surface 24A of the plunger 24 with the impact surface of the pole piece 16, referred to as the "pinch region." Having the size of the through-hole 27A too large results in fuel too quickly leaving the pinch region and the fuel insufficiently damping the plunger 24. Having the size of the through-hole 27A too small results in too much fuel remaining in the pinch region so as to cause too much damping and the armature assembly being unable to complete its stroke. With the size of the through-hole 27A correctly sized, fuel disposed in the pinch region as the plunger 24 rapidly approaches the pole piece provides damping of the plunger 24, thereby reducing the impact noise when the plunger 24 contacts the pole piece 16.

Following the armature assembly having completed its stroke, the solenoid assembly is de-energized. After the magnetic field has sufficiently decayed, the spring 22 begins moving the armature assembly to its original, de-energized position. The first fluid path FP1 and the second fluid path FP2 allows for a reduction or elimination of any pressure force to counteract the spring 22 to separate and move from the pole piece 16. As the armature assembly moves from the pole piece 16, a secondary swept volume of fuel is pulled by a pressure differential into the first fluid path FP1 and the second fluid path FP2 so as to collect in the expanding space between the pole piece 16 and the armature assembly so that the solenoid assembly 100 is able to perform damping on the armature assembly the next time the solenoid is energized.

The operation of the solenoid assembly 200 will be described with respect to FIG. 2, and somewhat resembles the operation of the solenoid assembly 100. However, as mentioned above, the armature 20, not the plunger 24, impacts the pole piece 16 via the shock-absorbing disks 19. As a result, the "pinch region" is the region A of the solenoid assembly 200 is the region in which the disks 19 are disposed. With the location of the pinch region A as well as the use of the disks 19, the secondary swept volume of the armature assembly is less than the secondary swept volume of the armature assembly of the solenoid assembly 100. As a result, the size of the through-hole 27A is smaller than the size of the through-hole 27A of the solenoid assembly 100 due to there being less fluid needing to be moved.

When the solenoid assembly 200 is energized, the armature 20 moves in response to the now built magnetic field, toward the pole piece 16. As the armature assembly moves closer to the pole piece, the space narrows between in the pinch region A forces the fuel in the space between the armature 20 and the pole piece 16, as well as the space above the plunger 24, to flow therefrom. With the first fluid path FP1 being relatively narrow, the size (and leading edge, relative to the flow of fuel) of the through-hole 27A of the spring retainer 27 is configured so that the amount of fuel exiting the solenoid assembly 200 through the through-hole 27A allows for a controlled flow of fuel through the angled surfaces of the armature 20 and the pole piece 16 and particularly between pinch region A. Having the size of the through-hole 27A too large results in fuel too quickly leaving the pinch region A and the fuel insufficiently damping the plunger 24. Having the size of the through-hole 27A too small results in too much fuel remaining in the pinch region A so as to cause too much damping and the armature assembly being unable to complete its stroke. With the size of the through-hole 27A correctly sized, fuel disposed in the pinch region A as the plunger 24 rapidly approaches the disks 19 provides damping of the plunger 24, thereby reducing the impact noise when the armature 20 contacts the stack of disks 19. With the armature 20 approaching the disks 19, the fuel in the pinch region A passes through and between the disks 19 so as to provide an enhanced deceleration of the armature assembly and with it, improved noise reduction.

The detailed operation of the operation of the solenoid assembly 200 will be described as the solenoid assembly operates in two different modes of operation—normal operation and wet priming. The noise generated from the impacting armature assembly during wet priming addresses a different solution than needed for the normal operating mode.

First consider the case of wet priming noise. As the vehicle (or other apparatus having a gas combustion engine) in which the fuel pump is disposed is placed into the "key on" mode, the engine control unit (ECU) primes the fuel injection system using the worst case (i.e., the longest by design) priming duration based on the population of pump performance and the specific system. This time is typically about 2-5 seconds. During this priming phase, the starter motor of the vehicle does not turn over the engine and the fuel injector(s) is not cycled. The fuel pump is operated at a relatively high frequency, causing the armature assembly to travel the full stroke for an initial brief duration, such as typically 10-30 cycles which pressurizes the fuel line between the fuel pump and the fuel injector(s).

The wet priming mode changes naturally, i.e., wet priming is not changed in or by the ECU, and includes changing from full stroke actuating to partial stoke actuating as the system approaches full pressure. When the pressure inside the primary pump chamber in the valve assembly of the fuel pump reaches normal operating pressure combined with a fully pressurized fuel line and no injected fuel, the outlet valve of the valve assembly to which the solenoid assembly 200 is operative connected does not open. During this portion of the priming, the only motion of the armature assembly is generated from the leakage flow passing through the diametrical clearance of the bushing 26 and any loss through backflow leakage of the inlet valve of the valve assembly as the spring 22 urges the armature assembly away from the pole piece 16. The distance of the armature 20 from the disks 19 is very small during this phase of priming, typically less than 0.1 mm at the beginning of the next actuation. At this small distance, the velocity of the armature assembly, typically about 0.2-0.3 meters per second, does not reach the impact velocities found during normal operation. This lower velocity is what requires a different solution for this operating mode, relative to the normal operating mode, although both methods ultimately contribute to noise reduction.

For this lower velocity impact, an effective method is to decelerate the slower impact using squeeze film energy during the impact. The shock absorbing disks 19 installed on the pole piece 16 are loosely attached and allow fuel to fill the voids between the disks. During the impact of the armature 20 and the disks 19, the fuel is forced from between the disks 19 and this deceleration lowers the tone, making the sound less offensive and reduces the overall noise level.

The second operational mode in which noise is reduced is the normal operation of the vehicle, and particularly at low speed and low power when the engine noise may not be sufficient to mask the noise from the fuel pump of which the solenoid assembly 200 forms a part. These operating conditions create armature distances from the shock absorbing disks 19 at the beginning of the fuel pump actuation of 0.3 to 1.0 mm depending on engine power, engine speed and the leakage fuel flow through the diametrical clearance of the bushing 26 to the plunger 24. These conditions lead to impact velocities of approximately 1-1.3 meters per second. When considering the outer diameter of the armature 20, the peak velocities of the armature plunger assembly create theoretical volumetric flow rates of more than 200 cc per second. These very high flow rates are utilized to generate back pressure to slow the armature 20 and the plunger 24 as the gap between the armature and the shock absorbing disks 19 approaches zero or gets very small, approximately about 0.02 and smaller. If the region above the armature assembly, currently the hollow pole piece 16, spring 22 and spring retainer 27, were blocked completely, all of the induced fuel flow from the secondary or parasitic swept volume would have to escape that pinch region A as the separation gets small. See FIGS. 2 and 6. The velocities would be much smaller than these in reality since the pressure to generate the flow through the pinch region A would be large enough to reduce the velocity of the armature assembly which in turn would reduce the fluid velocity and reduce the noise from the armature assembly impact.

To completely block this region would slow the attraction time of the armature assembly and make high frequency operation limited or impossible. This solution is a compromise between the need for noise damping and impact wear reduction on one hand and the performance of the fuel pump on the other hand. The region above the armature assembly has the second fluid path FP2 in which the fuel exits through the through-hole 27A in the spring retainer. The leading edge (relative to the escaping fuel) of the spring retainer 27 through-hole 27A and the diameter thereof both help control the deceleration of the armature plunger 24 by generating a pressure to decelerate the plunger as the pinch region A closes.

These two features of the solenoid assembly 200, the shock absorbing disks 19 and the fluid paths FP1 and FP2, work together in the solenoid assembly 200 of the fuel pump to help reduce the noise created by the high velocity impact of the armature assembly against the shock absorbing disks 19.

Other embodiments for utilizing the parasitic pumping of the fuel (i.e., the secondary swept volume) include the hole 27A in the spring retainer 27 being or including a check valve. The device to control the fuel flow or pressure in this region may be separated from the spring retainer 27. In addition or in the alternative, the exit of fuel from the pinch region and/or the region between the armature assembly and the lower portion of the pole piece 16 does not have to be a hole or orifice, but may be a torturous path instead.

Figure 7:
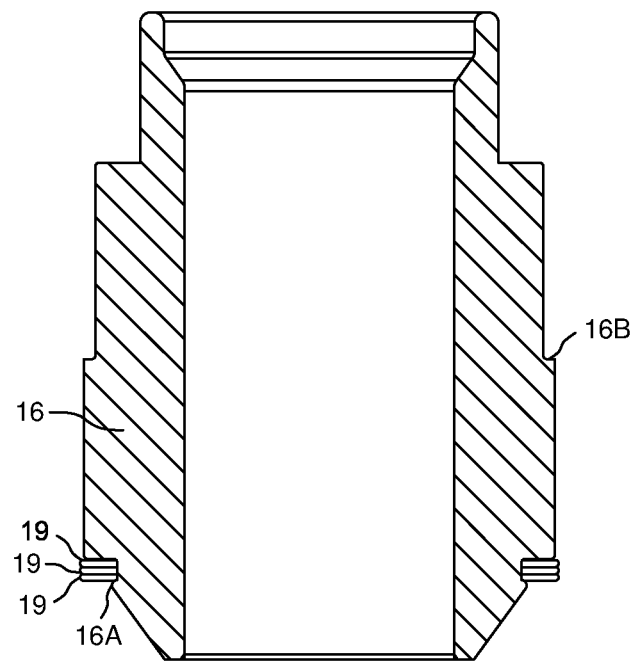
FIGS. 7-13 illustrate the solenoid assembly of FIG. 2 at various stages during the assembly thereof.

The method of assembling the solenoid assembly 200 will be described with respect to FIGS. 7-12. After obtaining the individual components of the solenoid assembly 200, the disks 19 are assembled onto the pole piece 16. Best seen in FIG. 3, the pole piece 16 may include a ledge 16A over which the disks 19 are slid. The ledge 16A serves to keep the disks 19 in their axial position along the pole piece 16. Once in position, the disks 19 are relatively loosely held against the pole piece 16. FIG. 7 illustrates the disks 19 being assembled onto the pole piece 16.

Figure 8:
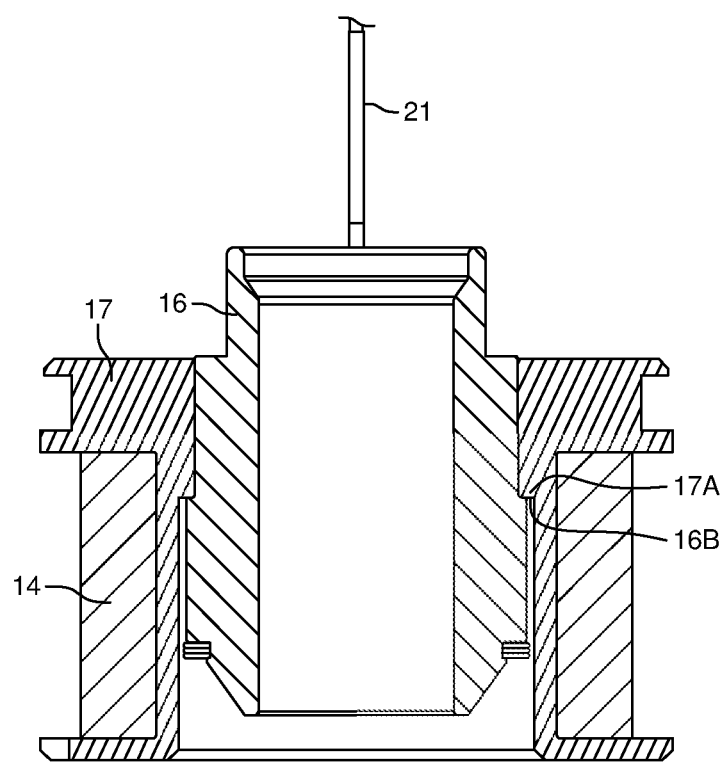

Next, the bobbin assembly is installed. Referring to FIG. 8, the coil 14 is constructed from copper magnet wire wound onto a molded bobbin 17 with terminals 21 (only one of which is shown in FIG. 8) which are attached to each end of the coil 14. The bobbin 17 includes a ledge or overhang 17A which rests on and contacts a ledge 16B on the pole piece 16.

Figure 9:
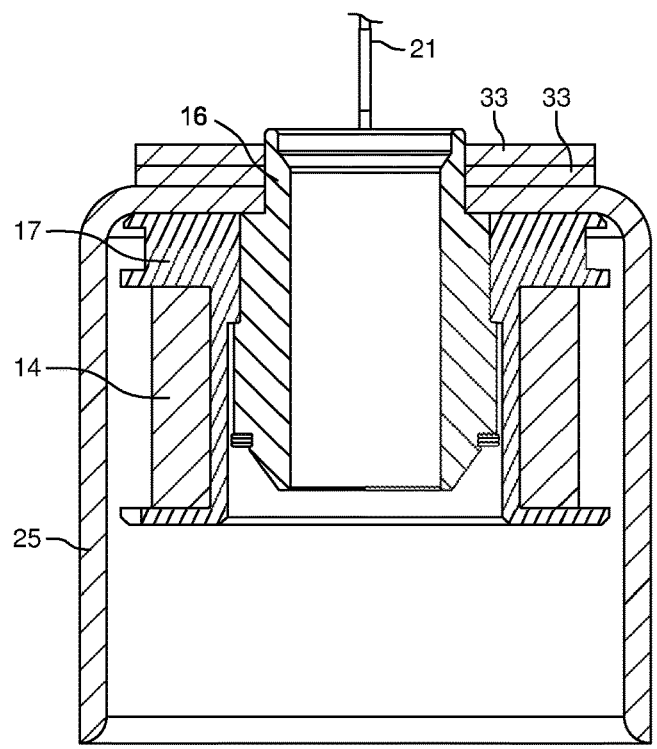

In FIG. 9, the housing 25 is installed as a slip fit in such a way to ensure the pole piece 16 and the coil terminals 21 are axially and radially positioned to properly exit the partly closed end of the housing 25.

Figure 10:
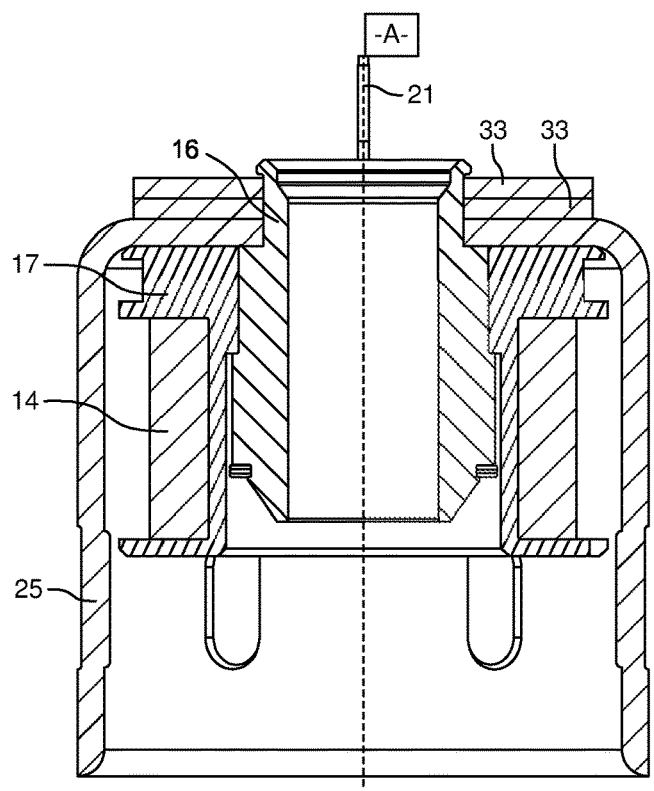

The next step in the assembly process is to install the flux washers 33 over the terminals 21 and the radial center of the partly closed end of the housing 25, as shown in FIG. 9. The flux washers 33 provide a path for the magnetic flux from the pole piece 16 to the housing 25. The flux washers 33 are arranged in a stacked arrangement. To meet both the electromagnetic requirements for the solenoid assembly and allow for the relatively low cost manufacturing process of stamping, at least two flux washers 33 are utilized in the illustrated embodiment, but more than two may be used. After the placement of the flux washers 33, the upper end of the pole piece 16 is crimped in such a way that the pole piece 16 clamps the flux washers 33 and the housing 25 to the pole piece 16. FIG. 10 shows the flux washers 33 held in place by the crimped end of the pole piece 16.

After the flux washers 33 have been disposed on the partly closed end of the housing 25, the washers are optionally attached to the housing 25 by an additional step to ensure a permanent attachment of the flux washers 33 to the housing. In an example embodiment, such additional attachment step includes welding, such as spot or laser welding. In another example embodiment, the additional attachment step is an adhesive step in which an adhesive is applied to the flux washers 33 and the housing 25. It is understood that the additional attachment step may utilize other techniques.

Figure 11:
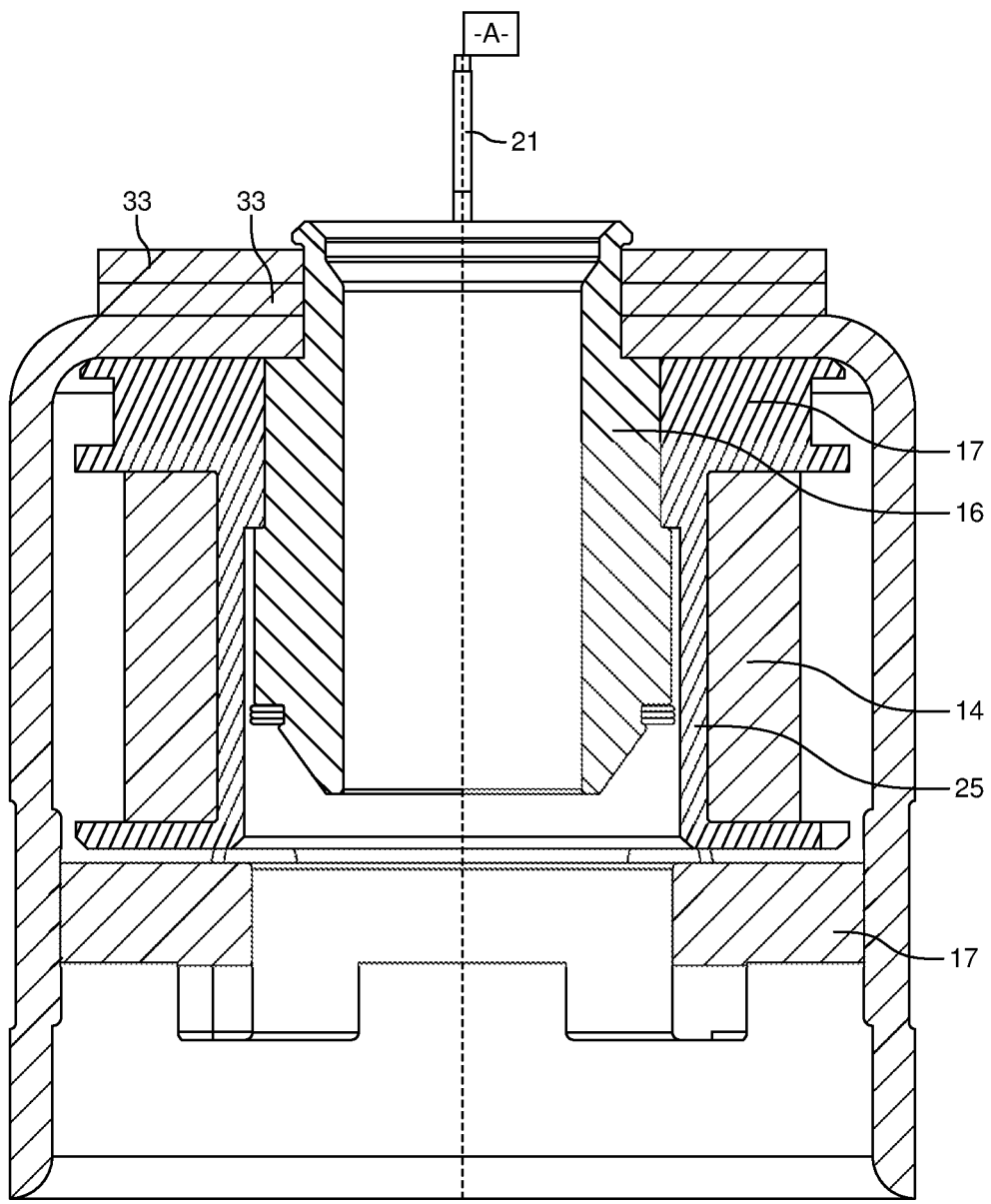
Figure 12:
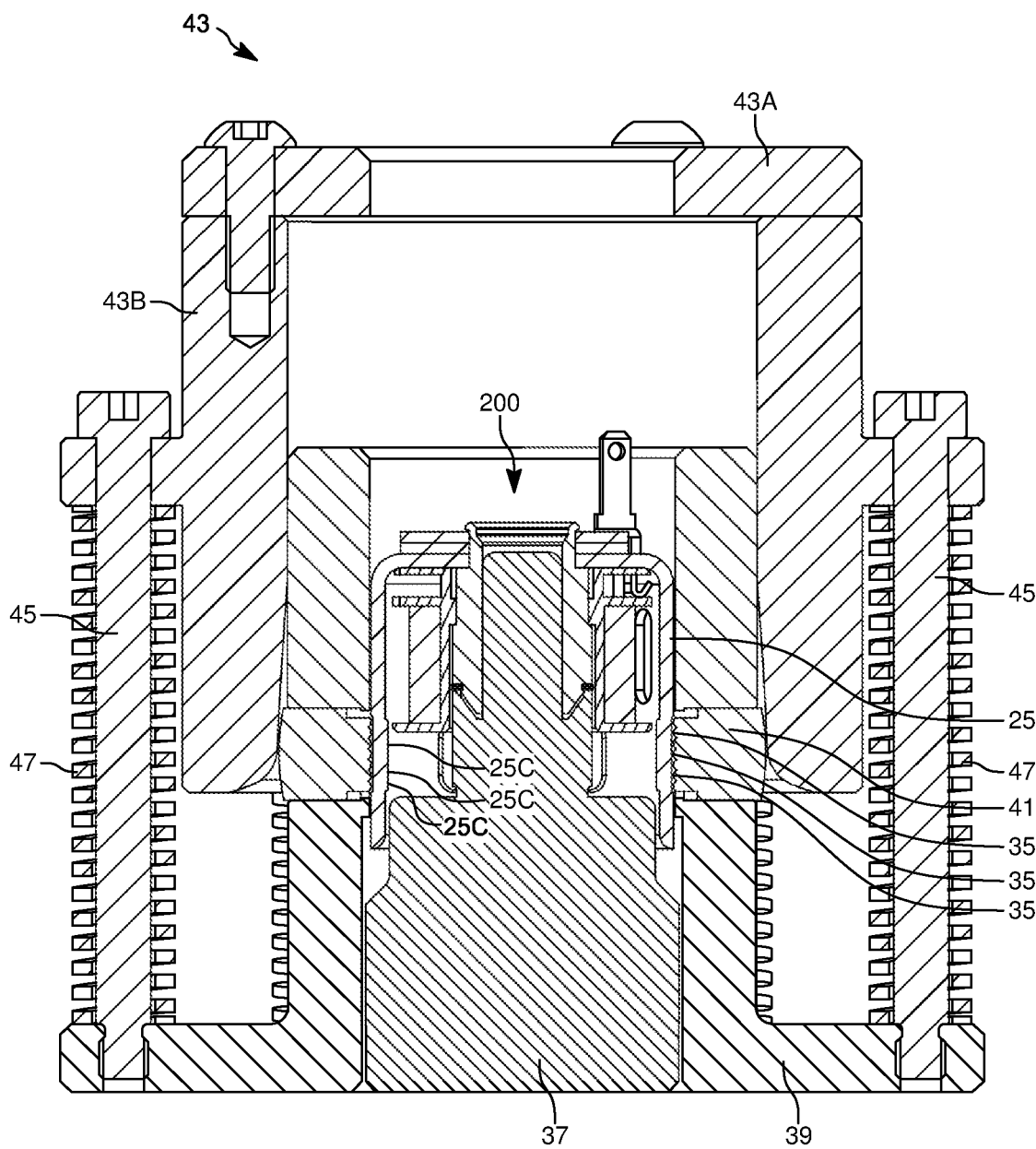

The bobbin retainer 18, which provides the return path for magnetic flux from the armature 20 via the fixed air gap to the housing 25, is added to carry the flux from the armature to the housing, as shown in FIG. 11. To create a proper solenoid, the air gaps and stroke of the armature 20 are tightly controlled. It is challenging to fabricate high speed solenoids with low cost components and processes while controlling tight tolerances on the assembled products these low cost parts create. Adding to this challenge is the fact that ferritic stainless steels exhibit very low galling thresholds, meaning these materials micro-weld at very low sliding contact pressures. This micro-welding drastically changes the installation forces making accurate placement nearly impossible due to the stiffness of the components.

To accomplish the proper installation of the bobbin retainer 18, the housing 25 is deformed in order to control the press forces of the bobbin retainer 18 to the housing 25. The housing 25 in this solenoid assembly 200 is generally cylindrical in shape and the interface of the bobbin retainer 18 with the housing 25 is also cylindrical. In this solenoid assembly 200, the parts have a close diametrical fit, including between the housing 25 and bobbin retainer 18 while always being a slip fit. The housing 25 is deformed by radially displacing or otherwise pressing slide members or pins 41 located axially below the shock absorbing disks 19, taking up the assembled tolerances, with equally spaced, in the radial direction, deformed zones 25C of housing 25 that reduces the effective internal diameter thereof. These deformed zones 25C create a press fit between the housing 25 and bobbin retainer 18, which when lubricated with a light oil, accommodates large tolerances and a controlled installation force without galling, thereby allowing very accurate positioning of the bobbin retainer 18 with respect to the shock absorbing disks 19. When built into a fuel pump, this positioning controls the effective stroke of the solenoid.

The device for deforming the housing 25 includes a solenoid positioning member 37 on which the solenoid assembly 200 (without the bobbin retainer 18) rests. A base member 39 surrounds the positioning member 37 and extends upwardly and surrounds the solenoid assembly 200. The largely cylindrically shaped base member 39 includes slide members 41 that are radially movable. Slide members 41 are distributed about the longitudinal axes of the positioning member 39 and the housing 25 of the solenoid assembly 200. In one example embodiment, each slide member 41 includes, at its radially inward end portion, a plurality of protrusions 35 which are axially spaced from each other, with the radial end of each protrusion 35 having a contact surface for contacting the housing 25. It is understood that the contact surface of the slide members 41 may have a different shape, size and/or orientation.

The deforming device further includes an inverted cup-shaped cover member 43 having a top 43A and side 43B which extends from the top 43A, receives the base member 39 and surrounds same. The inner surface of the side 43B is tapered radially outwardly such that the inner diameter of the side 43B of the cover 43 at or near the open end thereof is greater than the inner diameter of the side 43B at or near the top 43A. Cover member 43 is mechanically coupled to the base member 39 by bolts 45 which threadingly engage with the base member 39. Springs 47, through which the bolts 45 extend, bias the cover member 43 in an elevated position relative to the bottom of the base member 39.

During the deformation of the housing 25, and after the solenoid assembly 200 is placed on the positioning member 37 so that the slide members 41 are disposed in the desired position along the housing 25, the cover member 45 is lowered relative to the solenoid assembly 200, the positioning member 37 and the base member 39 by turning the bolts 45. Such lowering causes the inner surface of the side 43B, which contacts slide member 41, to move the slide members 41 radially inwardly as the inner diameter of the portion of the side 43B which contacts the slide member 41 is reduced due to the tapered inner surface of the side 43B. The radially inward movement of the slide members 41 deforms the housing 25. This results in a portion of the housing 25, i.e., the deformed portion of the housing 25, having a recessed outer surface and a protruding inner surface. After the housing is deformed in this instance, the positioning member 39 may be rotated about its longitudinal axis so that other portions of the housing 25 may face the slide members 41 for providing further deformations along the housing 25. Once a suitable number of housing deformations have been made, the bobbin retainer is inserted in place within the housing 25.

In an example embodiment, the slide members 41 are largely flat faced, round members, each with a height that is approximately twice the height of the bobbin retainer 18 to which the housing 25 is engaged in the press fit. For this solenoid assembly 200, the bobbin retainer 18 is 3 mm thick, and the slide members 41 used to deform the housing is 6 mm. The axial center of the sliding members 41 coincide with the center plane of the bobbin retainer 18 and there are six slide members 41 equally spaced about the housing 25. It is understood that the number of slide members 41 may be more or less than six, with equal or non-equal radial spacing or even non-equal diameters of the protrusions in other embodiments.

Figure 13:
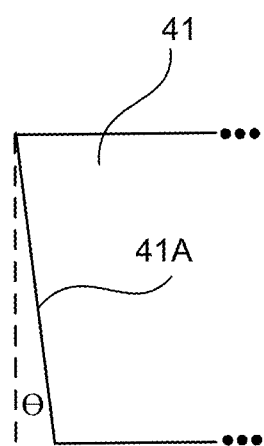

In another embodiment, shown in FIG. 13, a portion of the slide member 41 which contacts the housing 25 is depicted. In this embodiment, the contact surface 41A of the slide member 41 is flat and/or planar. The contact surface 41A is also angled relative to a vertical axis and/or the outer surface of the housing 25. The upper end of the angled contact surface 41A extends further towards the housing 25 than the lower end of the angled contact surface 41A. In one embodiment, the angle θ is between 0.5 degrees and 7 degrees from the vertical axis, such as between 1 degree and 3 degrees. The deformation caused by the slide member 41 of FIG. 13 results in an inwardly tapered inner surface of the housing 25, with the inner diameter of the deformed area being smaller at the top of the deformation than the inner diameter of the deformed area at the bottom of the deformation. The angled deformation of the housing 25 allows for easier press-fit positioning of the bobbin assembly 18 within the housing.

Once positioned with this process, the bobbin retainer 18 withstands a load of greater than 1000 N before shifting or moving from its position. After the bobbin retainer 18 is positioned in the housing 25 in a press-fit engagement therewith, the bobbin retainer 18 is optionally connected to the housing 25 in an additional attachment step to ensure that the bobbin retainer 18 is permanently attached to the housing 25. In an example embodiment, such additional attachment step includes welding, such as spot or laser welding. In another example embodiment, the additional attachment step is an adhesive step in which an adhesive is applied to the flux washers 33 and the housing 25. It is understood that the additional attachment step may utilize other techniques.

This process is also useful for designs needing to be pressed in prior to welding, and has shown resistance to shifting axial or radial position even after laser welding.

Figure 14:
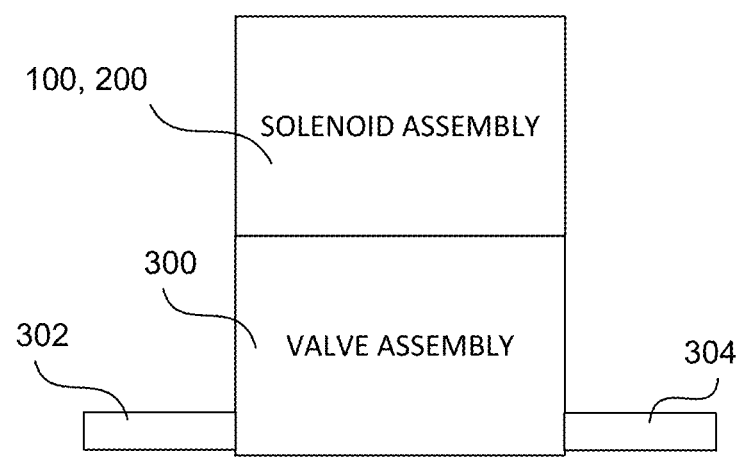
FIG. 14 is a block diagram of a fuel pump including the solenoid assembly of FIG. 1 or 2.

FIG. 14 is a block diagram illustrating a fluid pump 10 having solenoid assembly 100 or solenoid assembly 200 coupled to a valve assembly 300. In an example embodiment, the fluid pump is a fuel pump. The valve assembly 300 is operatively coupled to the solenoid assembly for pumping fluid from a fluid inlet 302 to a fluid outlet 304. The fluid outlet 304 is configured for connection to a fluid line for supplying the fluid under pressure. In an example embodiment, the valve assembly 300 includes a pump chamber which is defined in part by the plunger 24; an inlet chamber which is in fluid communication with the pump chamber via an inlet valve; and an outlet chamber which is fluid communication with the pump chamber via an outlet valve. Controlling the solenoid assembly 100 or 200 to move the armature assembly in a reciprocating manner causes fluid to flow from the fluid inlet 302 to the pump chamber via the inlet chamber and the inlet valve, and to flow from the pump chamber to the fluid outlet 302 via the outlet chamber and the outlet valve. The particular features of the valve assembly 300 and the fluid pump 10 may include the features described in U.S. patent applications identified in the cross reference section above, the contents of which are hereby incorporated by reference herein in their entirety.

The solenoid assemblies 100 and 200 provide a low cost energy efficient design to fix and/or address the problems with high frequency piston pump noise. The solenoid assemblies 100 and 200 may be used in positive displacement pumps or any other high or low frequency solenoid assemblies that are operated at least partly submerged in a fluid.

The example embodiments have been described herein in an illustrative manner, and it is to be understood that the terminology which has been used is intended to be in the nature of words of description rather than of limitation. Obviously, many modifications and variations of the invention are possible in light of the above teachings. The description above is merely exemplary in nature and, thus, variations may be made thereto without departing from the spirit and scope of the invention as defined in the appended claims.

We claim:

1. A solenoid assembly of a fuel pump, comprising:
   a housing having an open end and a partly closed end;
   a pole piece fixedly disposed within the housing;
   a bobbin assembly disposed within the housing and including a coil disposed proximal to the pole piece; and
   a bobbin retainer disposed between the open end of the housing and the bobbin assembly, a radially outer surface of the bobbin retainer contacting the housing, wherein a portion of the housing which is adjacent the bobbin retainer has an outer surface that is recessed and an inner surface that protrudes radially inwardly, relative to an inner surface of other portions of the housing, and the inner surface of the portion of the housing is positioned against and contacts the radially outer surface of the bobbin retainer.

2. The solenoid assembly of claim 1, wherein the housing, including the portion thereof, is integrally formed as a unitary member.

3. The solenoid assembly of claim 1, wherein the bobbin assembly includes a bobbin around which the coil is wound, the bobbin includes a ledge, and the pole piece includes a ledge on which the ledge of the bobbin rests.

4. The solenoid assembly of claim 1, wherein the bobbin retainer has a press fit engagement with the portion of the housing and a slip fit relationship with the housing not containing the protruding inner surface, the press fit engagement fixing the bobbin retainer within the housing.

5. The solenoid assembly of claim 1, further comprising a plurality of flux washers which are disposed externally of the housing along the partly closed end thereof, the flux washers forming a stack of flux washers.

6. The solenoid assembly of claim 5, wherein the partly closed end of the housing includes a central aperture defined through the partly closed end, an end of the pole piece extends from the central aperture of the partly closed end of the housing, and the flux washers are disposed around the end of the pole piece.

7. The solenoid assembly of claim 6, wherein the end of the pole piece extends in a radial direction, relative to a longitudinal axis of the solenoid assembly, over a portion of the stack of flux washers so as to clamp the stack in place against the housing.

8. The solenoid assembly of claim 7, wherein the flux washers are attached to the housing via one of a weld connection and an adhesive connection.

9. The solenoid assembly of claim 7, wherein the end of the pole piece is crimped over the portion of the stack of flux washers.

10. The solenoid assembly of claim 1, wherein the bobbin retainer is attached to the housing with one of a weld connection and an adhesive connection.

11. The solenoid assembly of claim 1, wherein the bobbin retainer has a press fit engagement with the portion of the housing.

12. A method of assembling a solenoid assembly, comprising:
    obtaining a pole piece;
    obtaining a bobbin assembly and attaching the bobbin assembly to the pole piece, the bobbin assembly including a bobbin and a coil wound around the bobbin;
    obtaining a housing and covering the pole piece and the bobbin assembly with the housing; and obtaining a bobbin retainer and inserting the bobbin retainer in the housing so that an inner surface of a portion of the housing contacts an outer surface of the bobbin retainer, wherein a portion of the housing which is adjacent the bobbin retainer has an outer surface that is recessed and an inner surface that protrudes radially inwardly, relative to an inner surface of other portions of the housing, and the inner surface of the portion of the housing is positioned against and contacts a radially outer surface of the bobbin retainer.

13. The method of claim 12, further comprising deforming a portion of the housing, wherein deforming the portion of the housing comprises obtaining a plurality of slide members, placing the slide members around the housing and moving the slide members towards the housing so as to contact and deform the portion thereof.

14. The method of claim 13, wherein each slide member has an angled contact surface for contacting the housing.

15. The method of claim 13, further comprising obtaining a cover member having a tapered inner surface and placing the cover member over the housing and the slide members, and moving the slide members comprises moving the cover member relative to the housing and the slide members so that contact between the inner surface of the cover and the slide members moves the slide members towards the housing.

16. The method of claim 15, further comprising obtaining a positioning member and placing the housing on the positioning member.

17. The method of claim 15, further comprising obtaining a base member, positioning the base member relative to the positioning member, and connecting the cover member to the base member so that a position of the cover member relative to the base member is adjustable.

18. The method of claim 17, wherein moving the cover member comprises adjusting the position of the cover member relative to the base member.

19. The method of claim 13, further comprising attaching the bobbin retainer to the housing by at least one of welding and adhering.

20. The method of claim 12, wherein the housing includes an open end and a partly closed end, and the method further comprises obtaining a plurality of flux washers and placing the flux washers over the partly closed end of the housing in a stacked arrangement.

21. The method of claim 20, wherein covering the pole piece comprises inserting an end of the pole piece through the partly closed end of the housing, placing the flux washers comprises placing the flux washers around the end of the pole piece, and the method further comprises crimping the end of the pole piece so that the end of the pole piece extends, in a radial direction relative to a longitudinal axis of the solenoid assembly, over at least part of the stacked arrangement of the flux washers and secures the flux washers to the housing.

22. The method of claim 20, further comprising attaching the flux washers to the housing by at least one of welding and adhering.

23. The method of claim 12, wherein the bobbin retainer has a press fit engagement with the portion of the housing.

* * * * *